(12) United States Patent
Wilens

(10) Patent No.: US 10,901,079 B2
(45) Date of Patent: Jan. 26, 2021

(54) PORTABLE PENETRATING RADAR

(71) Applicant: David Ira Wilens, Herndon, VA (US)

(72) Inventor: David Ira Wilens, Herndon, VA (US)

(*) Notice: Subject to any disclaimer, the term of this patent is extended or adjusted under 35 U.S.C. 154(b) by 210 days.

(21) Appl. No.: 15/879,116

(22) Filed: Jan. 24, 2018

(65) Prior Publication Data
US 2019/0227160 A1 Jul. 25, 2019

(51) Int. Cl.
G01S 13/88 (2006.01)
G01S 7/282 (2006.01)
G01S 7/285 (2006.01)
F41H 11/136 (2011.01)

(52) U.S. Cl.
CPC .......... G01S 13/885 (2013.01); F41H 11/136 (2013.01); G01S 7/282 (2013.01); G01S 7/285 (2013.01)

(58) Field of Classification Search
CPC .... G01S 13/855; G01S 13/887; G01S 13/885; G01S 13/888; G01S 13/0209; G01S 7/282; G01S 7/285; G01V 3/12; H01Q 1/24; H01Q 1/273; H01Q 1/38; H01Q 9/28; H01Q 15/08
USPC .......................................... 342/22
See application file for complete search history.

(56) References Cited

U.S. PATENT DOCUMENTS

| | | | | |
|---|---|---|---|---|
| 5,248,975 A | * | 9/1993 | Schutz | G01S 7/282 342/202 |
| 6,252,538 B1 | * | 6/2001 | Chignell | G01S 13/0209 342/195 |
| 6,396,433 B1 | | 5/2002 | Clodfelter | |
| 6,462,696 B1 | * | 10/2002 | Gorman | G01S 13/0209 342/176 |
| 7,002,511 B1 | * | 2/2006 | Ammar | G01S 7/032 342/118 |
| 7,042,385 B1 | | 5/2006 | Wichmann | |
| 7,649,492 B2 | | 1/2010 | Wilens | |
| 7,652,619 B1 | | 1/2010 | Hibbard | |
| 7,659,847 B2 | * | 2/2010 | Bausov | E21C 27/24 342/129 |
| 7,675,454 B2 | | 3/2010 | Lavedas | |
| 7,683,821 B1 | | 3/2010 | Clodfelter | |
| 7,692,598 B1 | | 4/2010 | Hibbard | |
| 7,788,793 B2 | | 9/2010 | Wichmann | |
| 8,040,272 B1 | | 10/2011 | Clodfelter | |
| 8,207,885 B2 | | 6/2012 | Hibbard | |
| 8,374,754 B2 | | 2/2013 | Clodfelter | |
| 8,854,247 B2 | | 10/2014 | Etebari | |
| 9,316,729 B2 | | 4/2016 | Wilens | |

(Continued)

OTHER PUBLICATIONS

UWB Air-Coupled Antenna for Ground Penetrating Radar, Hossein Azodi, TU Delft University, 2010 (Year: 2010).*

(Continued)

Primary Examiner — Erin F Heard
Assistant Examiner — Michael W Justice

(57) ABSTRACT

Method and apparatus is a handheld ground penetrating radar which transmits radar pulses and acquires and processes received data for presentation on a display allowing a user to identify buried targets. Novel low cost approach to portable high-resolution light weight penetrating imaging. Method and apparatus for a portable penetrating radar incorporating a display depicting permittivity variation versus distance and time as the medium is scanned.

20 Claims, 9 Drawing Sheets

(56) References Cited

U.S. PATENT DOCUMENTS

| | | | |
|---|---|---|---|
| 9,337,812 B2 | 5/2016 | Bandell | |
| 2002/0080057 A1* | 6/2002 | Annan | G01S 13/003 342/22 |
| 2005/0156600 A1* | 7/2005 | Olsson | G01V 3/15 324/329 |
| 2006/0187537 A1* | 8/2006 | Huber | G01B 9/02091 359/337.22 |
| 2013/0113648 A1* | 5/2013 | Duvoisin, III | H01Q 1/273 342/22 |

OTHER PUBLICATIONS

Melvin, William L, Principles of Modern Radar, 2014, pp. 691-746, vol. iii, Scitech Publishing, Edison, NJ.

Raimundo, Xavier Zage, FMCW Signals for Radar Imaging and Channel Sounding, 2015, pp. 33-34, Academic Support Office, Durham University, Old Elvet, Durham, UK.

R-Visor brochure, Aug. 29, 2018, Chemring Sensors and Electronic Systems, Sterling, VA, USA.

Husky Mounted Detection System with Wire Detection brochure, Sep. 28, 2016, Chemring Sensors and Electronic Systems, Sterling, VA, USA.

Groundshark brochure, Dec. 13, 2019, Chemring Sensors and Electronic Systems, Sterling, VA, USA.

\* cited by examiner

FIG. 5 Equivalent Time Sampling

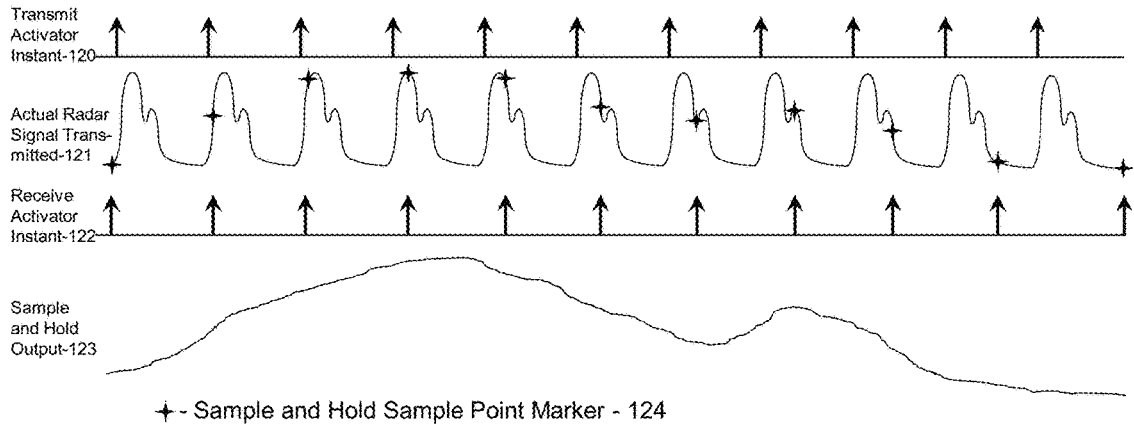

+ - Sample and Hold Sample Point Marker - 124

Transmit pulse start instant is initiated by the transmit activator pulse

Sample and hold instant is timed by the receive activator pulse

Sample and hold output (123) is continuous time representation of the discrete time samples which represents the actual radar signal transmitted but stretched out into equivalent time.

FIG. 6

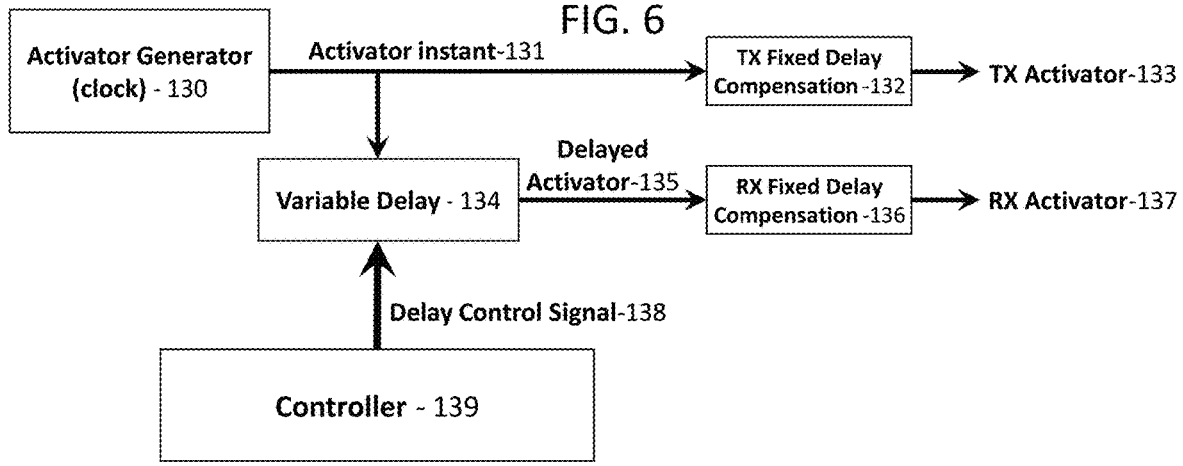

PORTABLE PENETRATING RADAR

CROSS-REFERENCE TO RELATED APPLICATIONS

None.

STATEMENT REGARDING FEDERALLY SPONSORED RESEARCH OR DEVELOPMENT

None.

FIELD

The technology herein relates generally to improved methods and apparatus for measuring and depicting permittivity variations of various media using electromagnetic radiation. Still more particularly, the technology herein relates to methods and apparatus for finding hidden objects using penetrating portable radar.

BACKGROUND

Unexploded ordnance (UXO) and landmines still affect 66 countries. Most of these countries are poor. Millions of people live in close proximity to UXOs and uncleared landmines. In 2015 and 2016 more states were reported to be contaminated and less area was cleared than in previous years. In 2015 over six thousand people, often children, were maimed or killed by a landmine. Also, many deminers are killed or injured while clearing mines. It costs as little as $3 to fabricate a landmine yet can cost more than 100 times that to clear and destroy one. "As of 2010, roughly 3,000 km2 of global landmass remain contaminated by landmines . . . . Besides the bodily harm that landmines inflict on innocent civilians, contamination also inhibits development. Land contaminated with mines and UXO cannot be used for farming or other agricultural practices, nor can roads and other infrastructure be constructed on the land. Even the most basic survival activities, such as collecting water and firewood, can be threatened when land is contaminated. "Landmine Facts," Internet Archive version of the James Madison University web page www.jmu.edu/cisr/_pages/research/landmine-facts.shtml, dated Sep. 15, 2016, available at http://web.archive.org/web/20160915115445/http://www.jmu.edu/cisr/_pages/r esearch/landmine-facts.shtml. "Landmine Monitor 2016," International Committee of the Red Cross, dated November 2016.

Realization of low radar cross section transmitters, receivers, and the Vee dipole antenna for use in ultra wideband radar was pioneered by a few folks who dedicated their careers to disseminate this technology.

In the prior art backscattering of continuous wave (CW) radar has been used to characterize or image media. It is limited in that only a narrow frequency or a selection of frequencies are used. Circuit complexity, operational complexity, high power, high cost, and weight are further disadvantages of CW radar and previous pulsed radars.

Prior art radars do not use low radar cross section techniques and produce clutter or spurious echoes that can be reflected off of the antennas, the radome, radome electronics, cabling, the batteries, other support structures, or housings. This clutter may then again reflect off of the ground or the measured media and reduce signal quality by obscuring valuable reflections.

What is needed are improvements to allow better signal quality, lower power, ease of portability and use, and simplification resulting in lower cost. Current commercially available ground penetrating radars require the antenna to be in contact with the surface. The antenna are dragged or rolled along the ground. This is problematic if the surface is not smooth or has obstacles.

SUMMARY

The technology herein greatly reduces the cost of finding, and hence clearing landmines, and fills a desperate need for countries and communities that can least afford expensive ground penetrating radar.

In addition to lowering cost, some of the benefits of the technology herein are increased distance, resolution, received signal quality, and reduced clutter all without the need to be in contact with the surface.

Lower weight and power consumption are other essential benefits of the technology herein allowing portability and ease of use.

The technology herein can be used by, but is not limited to professionals such as police, and utility workers, yet simple enough to use by untrained deminers, amateur treasure hunters, home remodelers, or the average consumer.

Backscattering of penetrating radar is useful for characterizing or imaging a wide range of media for a wide variety of uses. When a pulse of electromagnetic radiation propagates though low permittivity media such as air or space, then intersects a boundary of higher permittivity of the medium under test, the pulse slows down and some of the energy of that pulse is reflected or backscattered back to a receiver. Subsequently some of the pulse continues to penetrate the medium and if it intersects a boundary different permittivity, the pulse changes speed and again some of the energy of the pulse is reflected or backscattered back to a receiver.

The time between the transmission of the pulse and the reception of the reflection is indicative of the distance of the permittivity discontinuity boundary from the antenna.

Good penetration and results can be obtained from virtually any non-infinite permittivity non-electrically conductive media. Possible media include but are not limited to the ground, walls, concrete, bricks, asphalt, wood, snow, ice, or plastic.

Better media characterization is obtained with a very wide range of frequencies by using pulsed radar. If a radar pulse can approximate an impulse or at least have a very fast rise time, a wide band of frequencies will be transmitted, an approximation of the impulse response may be obtained, and the measured medium can be well characterized.

BRIEF DESCRIPTION OF THE DRAWINGS

The following detailed description of exemplary non-limiting illustrative embodiments is to be read in conjunction with the drawings of which:

FIG. 5 illustrates an equivalent time sampling concept; and

FIG. 6 illustrates an embodiment of equivalent time sampling.

DETAILED DESCRIPTION OF EXAMPLE EMBODIMENTS

Figure 1:
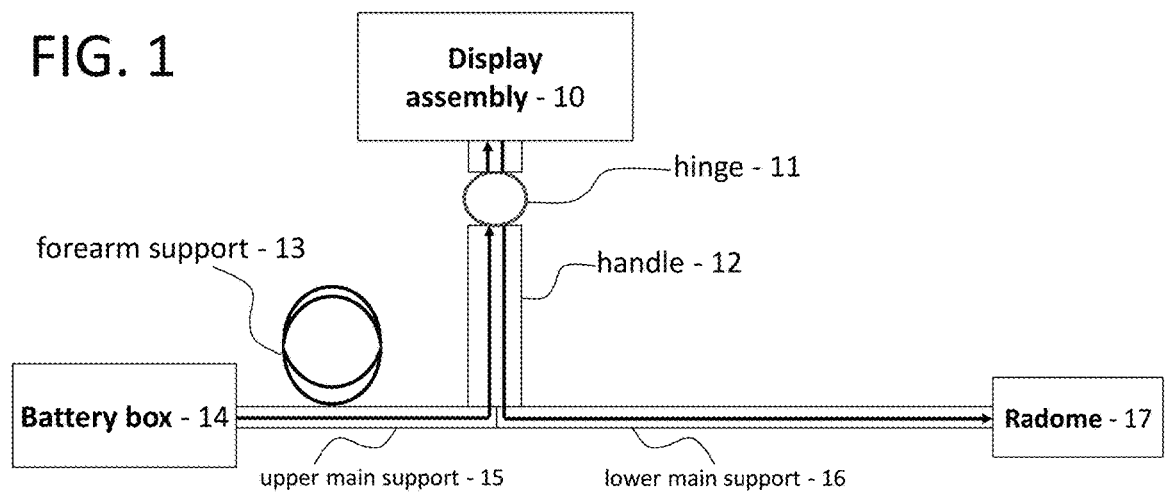
FIG. 1 illustrates the general physical arrangement for one embodiment.

A fast rise time pulse of electromagnetic radiation is transmitted in one embodiment with a Vee dipole antenna which directs the pulse in the desired direction and a similar receive Vee dipole is placed nearby and parallel to the transmit antenna.

Clutter can be reflected off of the antennas, the radome, radome electronics, cabling, the display assembly, the batteries, other support structures and housings, or the user. To mitigate this, in one embodiment, low radar cross section is implemented by keeping the user and the high radar cross section electronics some distance away from the radome using thin connecting cabling and wires, by making the housing and its support structures from low radar cross section materials, by minimizing the radome electronics, and by using a dipole antenna such as a resistively loaded Vee.

Low radar cross section and reduced clutter allows clutter free imaging to be acquired while the radome is in contact with the ground or several feet away from the ground.

Since the received frequencies of interest range up to several GHz, real time sampling would be cost prohibitive for a consumer product. In order to reduce analog to digital conversion cost, in one embodiment equivalent time sampling is used, in which the same transmit pulse is repeated many times and one or more samples are obtained for each transmit pulse repetition and the delay between transmit pulse and receive sample or samples is increased by a small amount for each repetition until enough samples are obtained to create an equivalent time sampling window that represents the real time sampling window.

The variable delay between transmit pulse and receive sample for equivalent time sampling is implemented in one embodiment with a programmable delay line. The input of the programmable delay line can be a step waveform such as a digital edge that occurs at the same instant as the transmit activator for the transmit pulse. The output of the programmable delay line can be a step waveform such as a digital edge that produces the receive activator of the receive sample. In a programmable delay line the delay can be varied by a delay control signal such as an encoded digital delay word. This delay control signal must not vary during the time that an input step waveform is propagating through the programmable delay line or a spurious output edge may be generated. To prevent this spurious output edge, the phase of the clock that changes the delay control signal can be managed to occur so that any change in the delay control signal does not propagate through the programmable delay line while the input step waveform is propagating through the programmable delay line.

In another embodiment the radar activators and the variable delay between transmit pulse and receive sample for equivalent time sampling can be implemented with one or more digital analog discriminator generators, which can be very stable over temperature variations, generating digital activators which have extremely accurate timing, obviating the need for a temperature controlled chamber.

To obtain good received signal resolution, relatively high frequencies as high as 1-10 GHz in one embodiment may be transmitted and received, therefore it is essential to maintain sub 100 picosecond accuracy on the transmit and receive activators. Since delay lines and semiconductor devices drift with temperature, one solution is to maintain the pertinent semiconductors at a constant temperature (see FIG. 11). This obviates the need for temperature compensation. In one embodiment temperature control is implemented with an ovenized chamber which is heated and/or cooled.

To simplify operation for the user, automatic calibration can be implemented wherever possible. In one embodiment, the offset voltage of the receiver is nulled (see FIG. 12). In one embodiment the transmitter power is automatically adjusted to a desired value (see FIG. 8). In another embodiment, the transmit power is initially turned on with low power that is gradually increased until a desired received peak voltage is obtained. In one embodiment the receive gain is adjusted to maximize the average signal to noise ratio when averaged over the entire measurement (see FIG. 13).

For a penetrating radar device, it is desirable to have an easily readable display whose backlight intensity varies with ambient light. In one embodiment a light sensor is used to detect the ambient light level and increase the backlight intensity when the ambient light increases and/or decrease backlight intensity when ambient light decreases to maintain readability while saving power.

To save cost and power, and/or to conform to regulatory agency rules such as Code of Federal Regulations FCC Title 47 Chapter 1 § 15.509(c) which require a manually operated switch that disables intentional radiation when not in use, a motion detector is used in one embodiment and a proximity detector is used in another embodiment to sense when the instrument is no longer in use so that intentional radiation or the power are turned off. A lack of motion is analogous to inactivity by the user. A lack of proximity between the portable penetrating radar and the user is also analogous to inactivity. The motion detector senses when there has not been motion for a period of time and shuts off the intentional radiation or the power. The proximity detector senses when there is a distance of more than a few inches for a period of time between the user and the portable penetrating radar indicating that the portable penetrating radar is no longer in use and shuts off the intentional radiation or the power.

In one embodiment in order to reduce clutter and/or improve received signal quality for more distant measurements, a longer low radar cross section shaft or similar such support structure is used to increase the physical distance from the low radar cross section antenna, radome electronics, and/or radome to any high radar cross section objects such as the user, any non-radome electronics, other wiring or other support structures.

In one embodiment, the received signal data is stored in local storage in the device. In another embodiment, the received signal data is transmitted via a wireless link to remote receiver.

In one embodiment, a navigation receiver adds navigation information to the received signal data. This navigation information can be continuously updated so the location associated with the received signal data can be determined.

In one embodiment, the received signal data is displayed on a flat-panel display or other electronically modulated optical device so that the measured data can be understood by a user. In another embodiment, the received signal data is displayed on a flat-panel display or other electronically modulated optical device in an modulated graphical fashion so that the color or intensity of a pixel corresponds to the relative permittivity of the medium being measured, the horizontal or vertical axis of the display corresponds to the time that the measurement was taken, and the other axis corresponds to the distance of the permittivity measurement from the antenna.

To save cost, to speed design time, to minimize software errors, or to make control or algorithm modifications easier; in one embodiment, an FPGA can be implemented without any microprocessor of any type. The FPGA controls all other semiconductor devices or performs algorithms on the collected data. The FPGA assists with the control of power supplies, generation of receive activator phase control, enabling or disabling of radar transmission, and human interfaces. These human interfaces can be one or more audio indicators, audio speakers, video controllers, displays, or touchscreens.

In one embodiment in order to improve received signal quality or lower radar cross section, a fiber optic link is used to communicate between the non-low radar cross section main control electronics and the radome electronics.

In one embodiment in order to improve received signal quality or lower radar cross section, a wireless link is used to communicate between the non-low radar cross section main control electronics and the radome electronics.

In one embodiment in order to improve received signal quality or lower radar cross section, electronics can be miniaturized into microelectronics such as an ASIC so that they can be placed close to the antennas in the radome. These microelectronics can include the following transmit functions: a pulse generator, a power amplifier, a balun, or a single ended to differential converter. These microelectronics can also include the following receive functions: a filter which may be accompanied by a balun, a several GHz bandwidth amplifier, a sample and hold circuit, an equivalent time sampler, a high speed analog to digital converter, or receive data processing using an FPGA or a microprocessor. These microelectronics can also include the following radar control functions: radar transmit or receive timing control, memory, an FPGA or microprocessor for radar control or receive data processing.

Referring to FIG. 1, in one embodiment the battery box (14), the forearm support (13), the handle (12), and the radome (17) are connected to the upper and lower main supports (15 and 16). The lower main support (16) and the radome (17) are fabricated with low radar cross section materials. The lower main support must be long enough so that spurious reflections or clutter from the battery box, the forearm support, the handle, the upper main support (15), and the user are received in the radome mounted RX antenna after the real time sampling window.

A longer lower main support will allow for increased distance from the spurious reflections or clutter and the radome which will allow for a longer real time sampling window.

The portable penetrating radar is designed so that the user holds the handle with his hand with his forearm of the same arm in the forearm wrap. The display assembly (10) holds the display and control electronics and is attached to the hinge (11) which is attached to the handle. The hinge is a ball joint allowing the display to be aimed to a person of any height and allowing the technology to be used by either the left or right arm of the user.

The battery box is the heaviest part of the portable penetrating radar, and is placed to the rear of the user so that the center of gravity of the downward force is focused behind the forearm wrap at the user's elbow to make it easy for the user to balance and move the portable penetrating radar.

Figure 2:
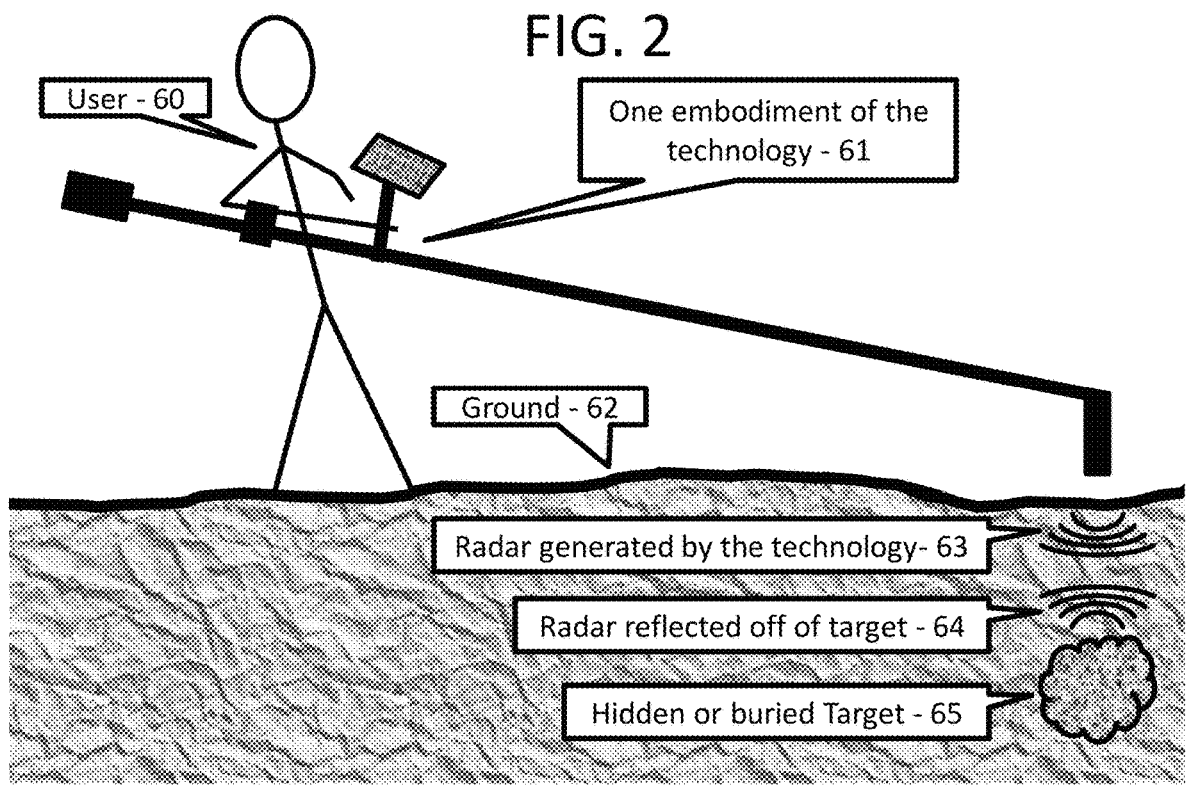
FIG. 2 illustrates how a user would use the technology in its environment in one embodiment.

Referring to FIG. 2, a user (60) can sweep one embodiment of the technology (61) across the ground (62) or other possible media which include but are not limited to the ground, walls, concrete, bricks, asphalt, wood, snow, ice, or plastic. Radar generated by the technology (63) is transmitted into the ground (62) or other media and is reflected off of the hidden or buried target (65). Radar reflected off of the target (64) is received by the technology, processed, and displayed in a form that is intelligible to the user.

Figure 3:
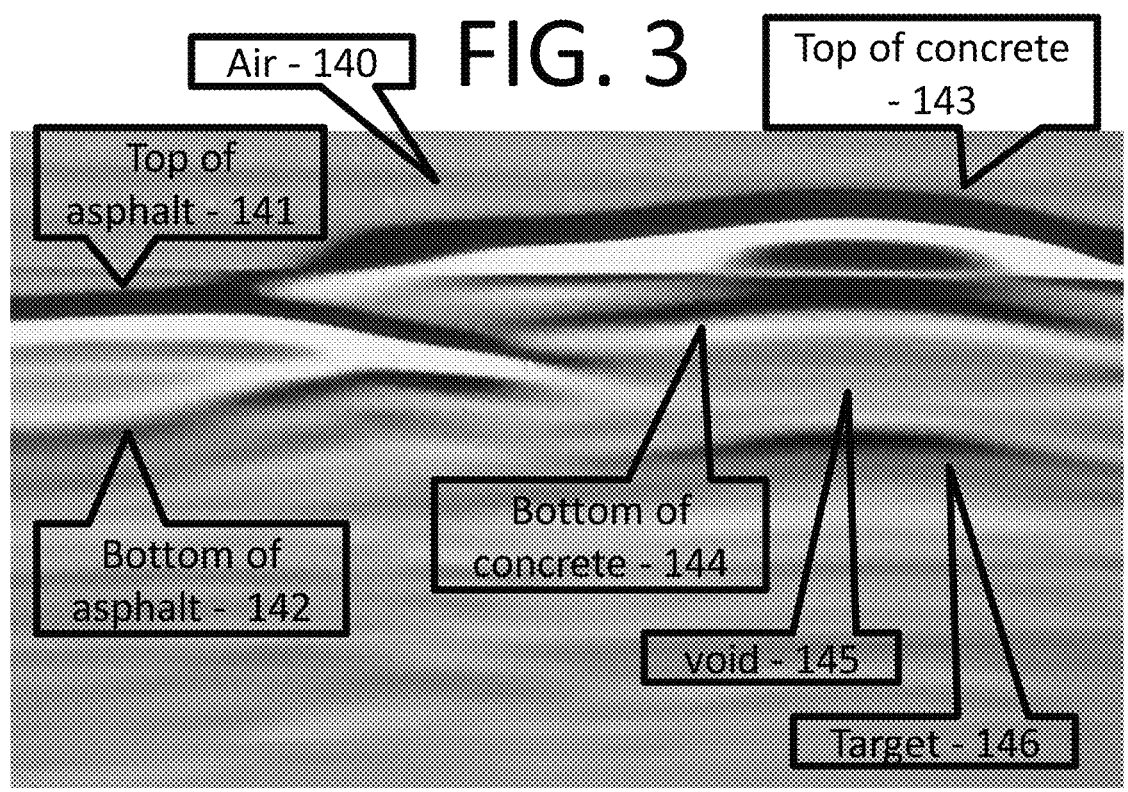
FIG. 3 is a drawing of an actual radar data display in one embodiment.

FIG. 3 is a drawing of real data as it can be displayed to a user in one embodiment. In this display the vertical axis depicts depth with the deepest features at the bottom. The horizontal axis depicts time as the technology is swept along the ground with the newest features on the right. Air above the ground is indicated by the area that is largely feature free (140). The top of the asphalt is indicated by the bold black line (141). The bottom of the asphalt is indicated by the black line (142). The top of the concrete is indicated by the bold black line (143). The bottom of the concrete is indicated by the bold black line (144). A void is indicated by the area that is largely feature free (145). A target or other discontinuity below the concrete and the void is indicated by the black line (146).

Figure 4:
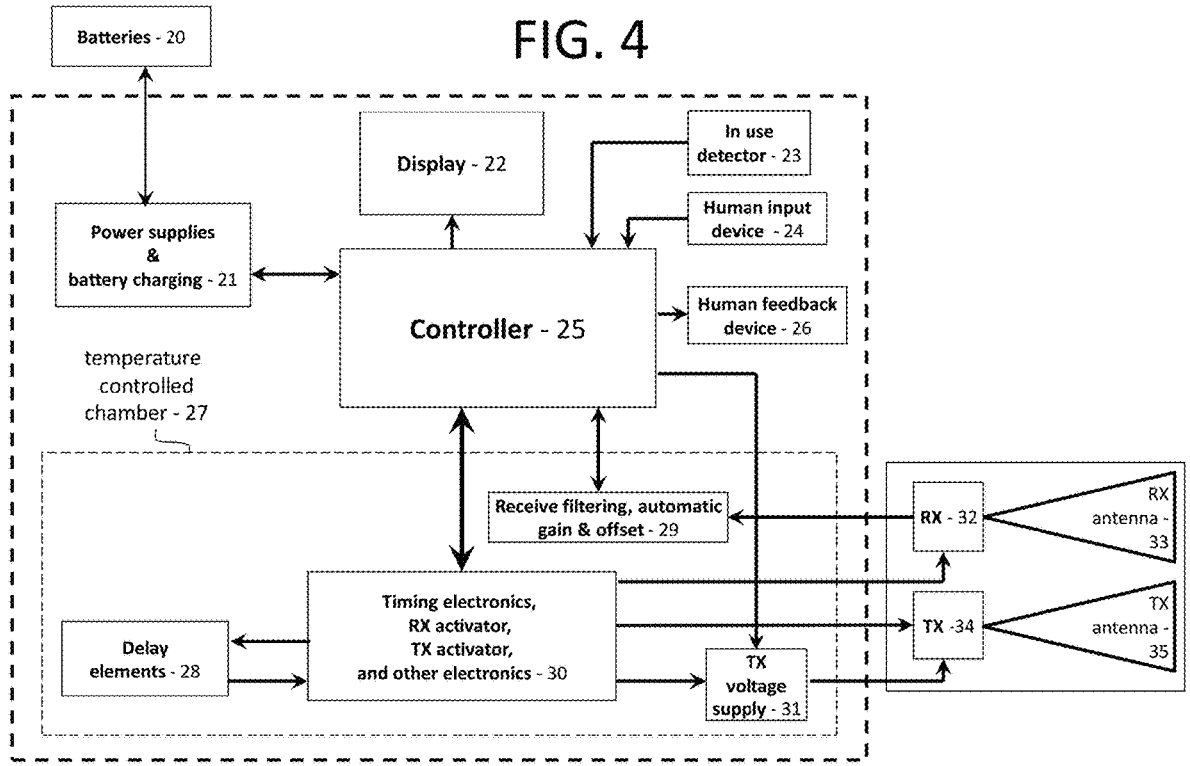
FIG. 4 illustrates the general electronic arrangement for one embodiment.

As FIG. 4 shows, in one embodiment the batteries (20) supply electrical power to the rest of the electronics. The batteries are replaced by a solar cell in another embodiment. The batteries are replaced by a fuel cell in another embodiment. Power supplies and battery charging (21) convert the battery power to the power needed by the electronics and allow for proper charging of the batteries.

The controller (25) in various embodiments is an FPGA, a microprocessor, or a combination FPGA and microprocessor. The controller controls the amount and timing of battery charging (21), the image on the display (22), the receive gain and offset (29), the human feedback (26) indicators and displays, the TX voltage supply (31), and the timing for the RX activator and TX activator (30). The controller also receives signals from the in use detector (23) which can be used to determine whether to turn on or off the TX voltage supply (31) or power to the entire portable penetrating radar. The controller also changes mode or functionality based on input data that the controller gets from the human input device (24).

The display (22) communicates to the user the status of the portable penetrating radar, menus and prompts for human input, and the received signal data.

The in use detector (23) is a sensor such as a motion detector or a proximity detector. A motion detector indicates motion, the lack of which indicates that the ground penetrating radar is not being used. A proximity detector detects that a user is in close proximity to the ground penetrating radar which indicates that the ground penetrating radar is in use.

The human input device (24) is a mouse, keyboard, or touchscreen that allows a user send data to or to communicate with the controller (25).

The human feedback device (26) is a display, one or more lights, a vibration device, or other indicator used to communicate to the user.

Many important parameters of electronic devices vary over temperature. The stability of some of these parameters such as propagation delay, gain, and output voltage, among others is essential to maintain desired radar transmission, avoid radar receive errors and improve the quality of the received radar data. The temperature controlled chamber (27) maintains delay elements (28), power supplies, amplifiers, among others at a constant temperature and therefore any temperature dependent parameters remain fixed.

The Timing electronics, RX activator, TX activator, and other electronics (30) are electronics that control the radar. Timing electronics work in conjunction with delay elements (28) to generate the RX and TX activators with proper timing. The TX activator causes radar transmission to take place with proper timing. The RX activator causes radar receive sampling to take place with proper timing. All these must remain at a constant temperature for best received radar data quality.

The delay elements (28) can be cable based, semiconductor based, surface acoustic wave, optical, superconducting, or other delay devices, and can be fixed or programmable. These must remain at a constant temperature for best received radar data quality.

The TX voltage supply (31) controls the signal quality and output power of the radar transmission and must remain at a constant temperature for best received radar data quality.

The receive filtering, automatic gain and offset (29) must remain at a constant temperature for best received radar data quality.

The TX (34) is a radar transmitter with low radar cross section coupled to a low radar cross section TX antenna (35).

The RX (32) is a radar receiver with low radar cross section coupled to a low radar cross section RX antenna (33).

Referring to FIG. 5, in one embodiment using equivalent time sampling a transmit activator causes an actual radar signal to be transmitted (121) at a transmit activator instant (120). Since real time sampling at this time is expensive, has high power demand, and requires significant circuitry footprint increasing the radar cross section; equivalent time sampling can be used which samples only one or several samples per actual radar signal transmitted. In one embodiment one receive sample is taken for each actual radar signal transmitted where a receive activator generates a receive activator instant (122) as indicated by the sample and hold sample point marker (124). The receive activator instant is delayed from the transmit activator instant by a small but increasing amount. This delay increase can be constant for each actual radar signal transmitted. For radar imaging purposes the delay can be increased on the order of a few picoseconds. If the receive sample is held in a signal until the next receive sample is obtained and held, an equivalent time representation of the actual radar signal transmitted can be generated as shown in the Sample and Hold Output (123). The time slowing factor is based on the delay increase, the repetition rate of the actual radar signal transmitted, and the number of samples in the desired sampling window.

In another embodiment instead of an increasing delay, the receive activator instant is delayed with some known pattern.

In another embodiment instead of delaying the receive activator instant, the transmit activator instant is delayed.

Referring to FIG. 6, in one embodiment using equivalent time sampling, an activator generator (130), which can be a clock, generates an activator instant (131). This activator instant (131) can be delayed by a TX fixed delay compensation (132) which can generate a TX activator (133). This activator instant (131) can also be sent to a variable delay (134), generating a delayed activator (135) which is also delayed by a RX fixed delay compensation (136) and used to generate the RX activator (137). The amount of this variable delay (134) can be controlled by a delay control signal (138) which can be determined by a controller (139).

In one embodiment the receive activator (137) is delayed from the transmit activator (133) by a small but increasing amount.

In another embodiment instead of an increasing delay, the receive activator (137) is delayed with some known pattern.

In another embodiment instead of delaying the receive activator, the transmit activator is delayed.

Figure 7:
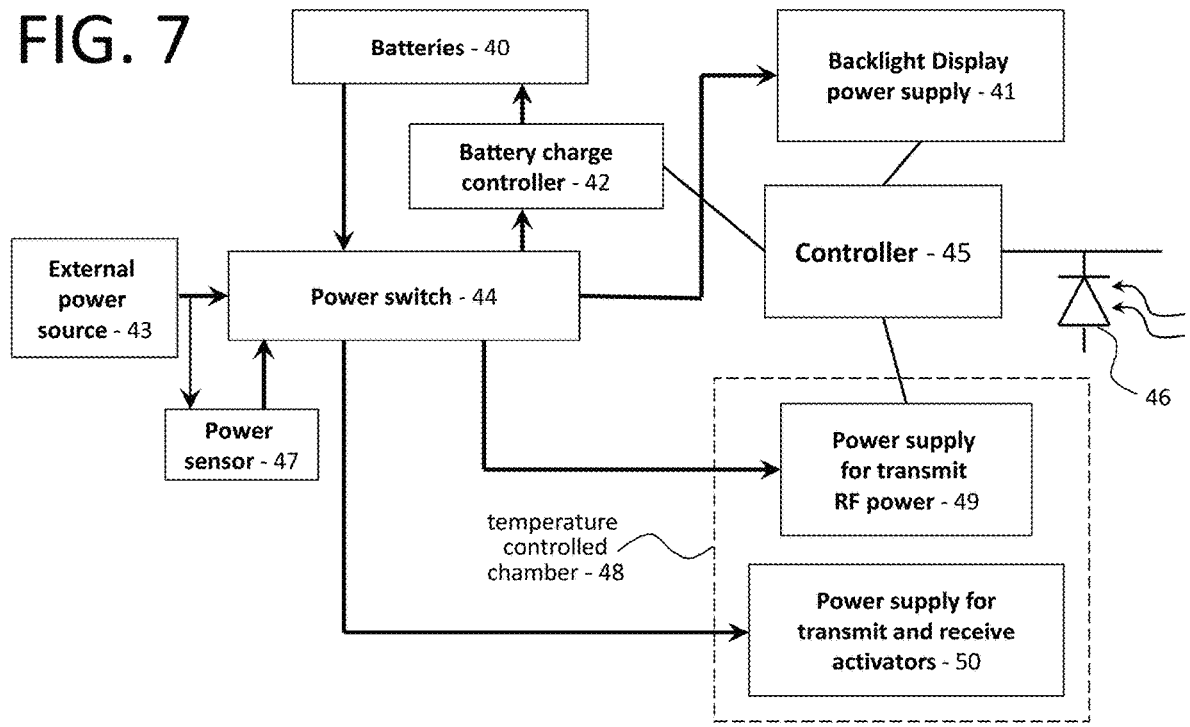
FIG. 7 illustrates the power supplies and controls for the power supplies for one embodiment.

Referring to FIG. 7, in one embodiment the external power source (43) can be an AC mains wall plug-in or other power supply and can be used to charge the batteries (40). The power sensor (47) can determine if the external power source is plugged in and if it has enough power to charge the batteries. The power switch (44) can determine whether the device is powered by the batteries or the external power source. The battery charge controller (42) and the controller (45) need to be powered during charging because they can control how long the batteries are charged and with how much power. The controller (45) can be a microprocessor, an FPGA, or a combination of microprocessor and FPGA in some various embodiments. The controller (45) gets input from the ambient light sensor (46) which can be used to control the intensity of the backlight display power supply (41). The controller (45) also can control the power supply for transmit RF power (49) which can be in the temperature controlled chamber (48) so that it remains at a constant temperature for best received radar data quality. The power supply for transmit and receive activators (50) can be in the temperature controlled chamber (48) so that it remains at a constant temperature for best received radar data quality.

Figure 8:
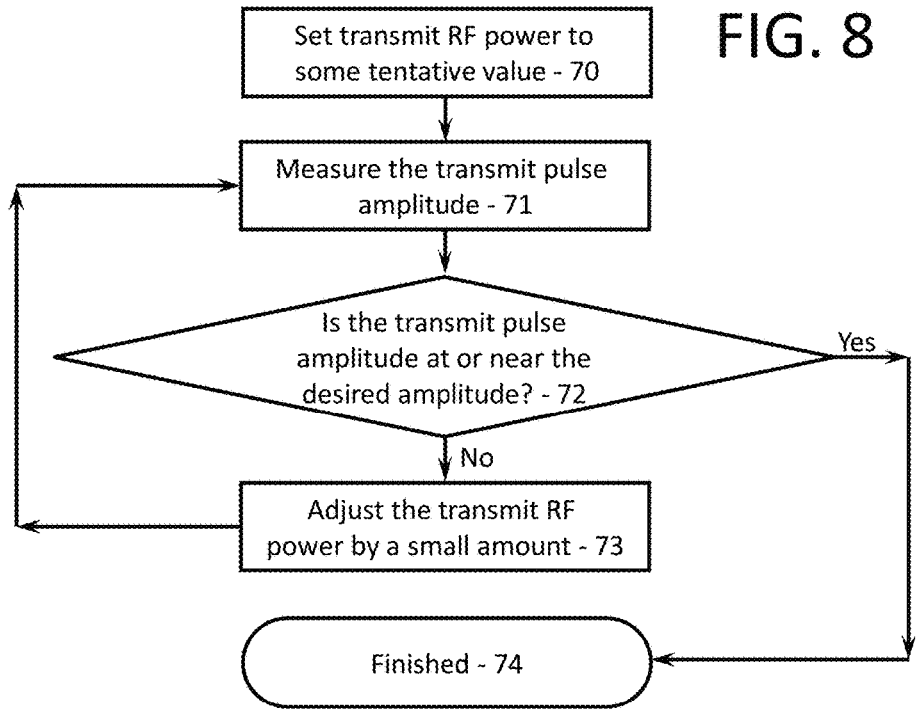
FIG. 8 illustrates the transmit RF power controller method for one embodiment.

Referring to FIG. 8, in one embodiment the transmit RF power (70) is set to some tentative value. Next the received version of the transmit pulse amplitude is measured (71). Next a decision is made based on the amplitude of the received version of the transmit pulse amplitude (72). If the transmit pulse amplitude is at or near the desired amplitude, the method is finished (74). Else, the transmit RF power is adjusted by a small amount (73) and the received version of the transmit pulse amplitude is measured (71) again and the process repeats until the amplitude is at or near the desired amplitude.

Figure 9:
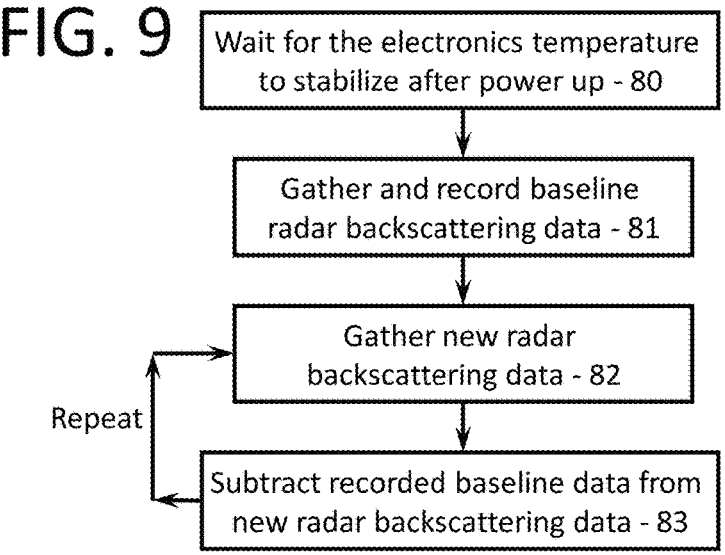
FIG. 9 illustrates the baselining and baseline subtraction method for one embodiment.

Referring to FIG. 9, in one embodiment the technology waits for the electronics temperature to stabilize (80) before displaying, saving, or transmitting gathered radar data. Then the technology gathers and records new baseline radar backscattering data (81). The recorded baseline data is optimally gathered when there are no objects, only air, near the radome, when only air is within the range of the real time sampling window so that the recorded baseline represents the intrinsic character or radar profile of the specific realization. Then the technology gathers new radar backscattering data (82). The technology then subtracts the recorded baseline data from new radar backscattering data (83) revealing any changes from baseline. These changes represent target information if the intrinsic character of the specific realization has not changed due to various factors such as temperature.

Figure 10:
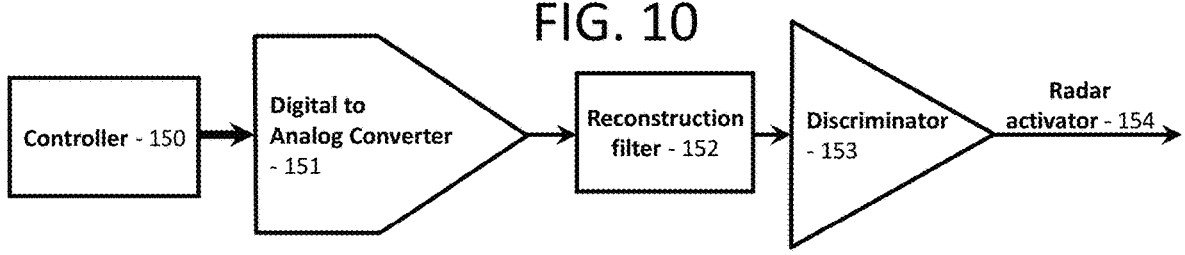
FIG. 10 illustrates radar activators produced by a digital analog discriminator generator in one embodiment.

Referring to FIG. 10, in one embodiment a digital analog discriminator generator is used to generate the radar activator signals. A controller (150) generates digital words to cause the analog to digital converter (151) to output a waveform typically a sine wave. The non-spectrally pure components inherent in the digital to analog conversion process can be removed by a reconstruction filter (152). The output of the reconstruction filter goes to a discriminator (153) which outputs a logic pulse when the input signal meets some defined threshold. This logic pulse can be used as a radar activator (154) for either transmit or receive.

Figure 11:
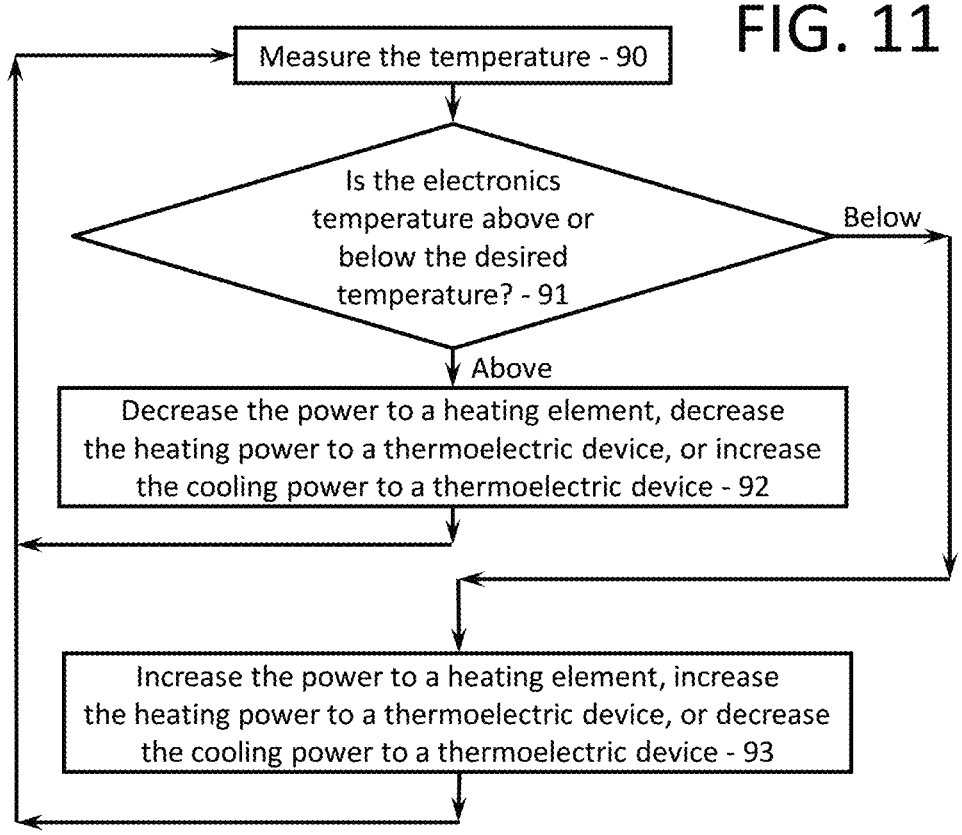
FIG. 11 illustrates a temperature control method.

Referring to FIG. 11, in one embodiment the temperature controller initially measures the temperature (90). If the electronics temperature is above the desired temperature (91); the temperature controller decreases the power to a heating element, decreases the heating power to a thermoelectric device, or increases the cooling power to a thermoelectric device (92) and the temperature is measured again (90). If the electronics temperature is below the desired temperature (91); the temperature controller increases the power to a heating element, increases the heating power to a thermoelectric device, or decreases the cooling power to a thermoelectric device (93) and the process repeats.

Figure 12:
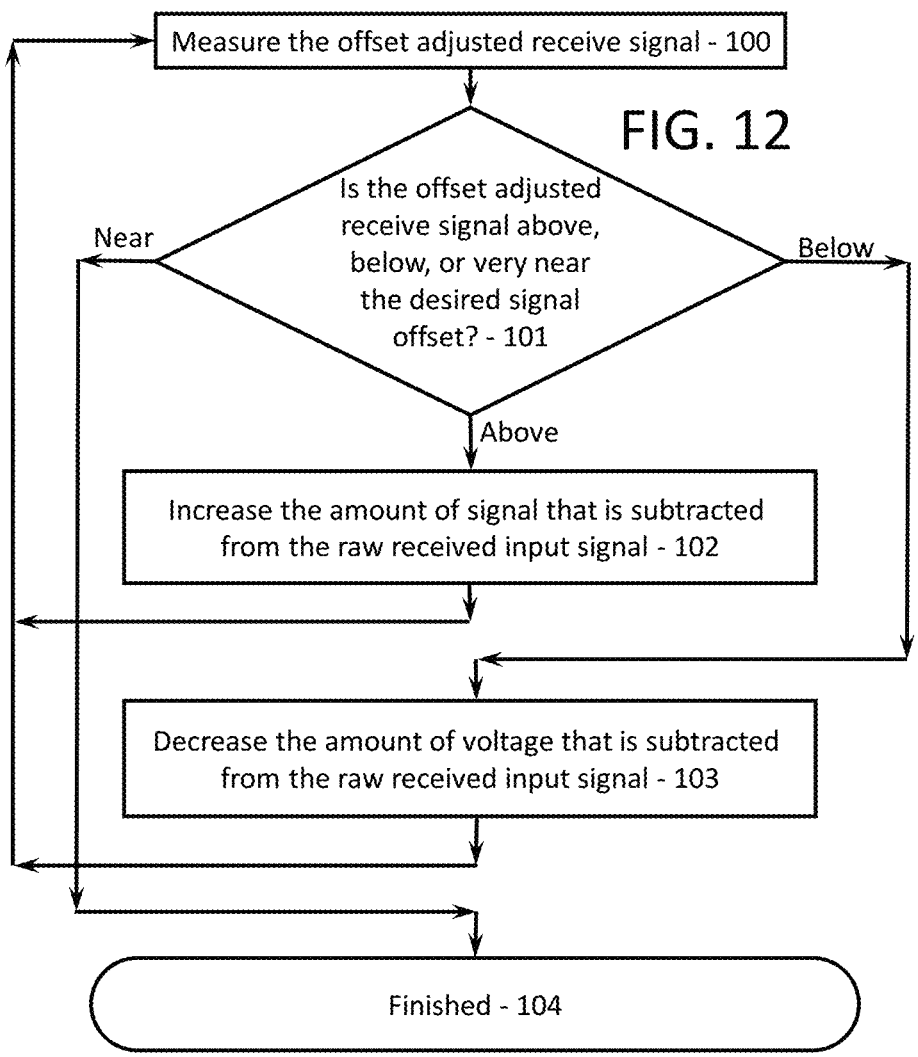
FIG. 12 illustrates a received signal offset nulling method.

Referring to FIG. 12, in one embodiment the controller initially measures the offset adjusted receive signal (100). If the offset adjusted receive signal is above the desired signal offset (101), the amount of signal that is subtracted from the raw received input signal is increased by a small amount (102) and the measurement (100) and test (101) are repeated. If the offset adjusted receive signal is below the desired signal offset (101), the amount of signal that is subtracted from the raw received input signal is decreased by a small amount (103) and the measurement (100) and test (101) are repeated. If the offset adjusted receive signal is very near the desired signal offset (101), then the method is finished (104).

Figure 13:
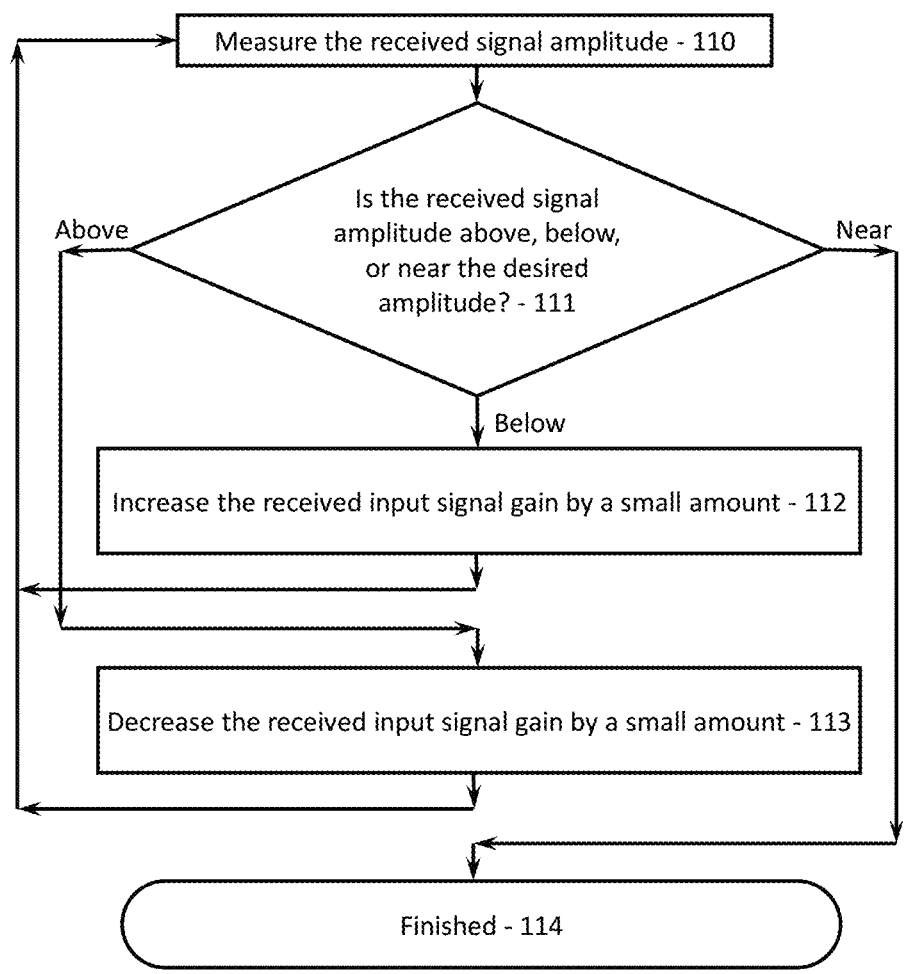
FIG. 13 illustrates a received signal gain control method.

Referring to FIG. 13, in one embodiment the controller initially measures the received signal amplitude (110). If the received signal is below the desired amplitude (111), the received input signal gain is increased by a small amount (112) and the measurement (110) and test (111) are repeated. If the received signal is above the desired amplitude (111), the received input signal gain is decreased by a small amount (113) and the measurement (110) and test (111) are repeated. If the received signal is very near the desired amplitude (111), then the method is finished (114).

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

Glossary

Activator—signal that causes a radar event.

Algorithm—data processing that allows for radar diagnostics, automatic control, and rendering receive data to the user.

Clutter—Spurious radar echoes especially from the user or equipment itself.

Delay Control Signal—A signal such as a digital word that changes the timing of a radar activator signal.

FCC—Federal Communications Commission.

FPGA—Field Programmable Gate Array.

High Radar Cross Section Electronics—Electronic devices and assemblies that reflect radar signals to a significant degree.

Low Radar Cross Section—low radar reflections due to the use of transparent or absorbent materials. Electronics can be made substantially transparent by reducing their size.

Medium—Any space or material through which electromagnetic waves propagate.

Microprocessor—Also called a Microcontroller, is an integrated circuit which can input data, perform operations on said data according to instructions stored in memory, and outputs results.

Nulled—The state of a signal where the DC component is optimized.

Radome—Low radar cross section structure comprising covering and support for radar antennas and possibly other electronics.

Radome Electronics—Low radar cross section electronics housed in the radome. Typically the minimum amount of electronics required to drive the TX and RX antennae.

Real Time Sampling—acquisition of a one-time real world signal using consecutive samples.

Receive Sample—a measurement of a real world signal that ideally occurs at only an instant in time.

Received Signal Resolution—Clarity or detail that can be discerned in a received signal and therefore the target of interest.

RF—Radio Frequency

Sampling Window—A period of either real or equivalent time composed of radar receive samples.

Shaft—Support structure that is not necessarily cylindrically shaped.

Temperature Compensation—Remediation or nullification of performance impairments of a device due to the changes in temperature by altering how device parameters change with temperature.

Temperature Control—Remediation or nullification of performance impairments of a device by limiting changes in temperature.

The invention claimed is:

1. Portable handheld radar comprising:
   a radome comprising a housing containing RF transmitting circuitry and RF receiving circuitry;
   the RF transmitting circuitry configured to radiate RF pulses;
   the RF receiving circuitry receiving ground reflections of said radiated RF pulses during sampling windows and producing outputs indicative of the received ground reflections of said radiated RF pulses;
   and a hand-supportable elongated shaft having a holding end and a distal end, the radome being disposed at or near said shaft distal end;
   wherein the shaft length between the shaft holding end and the shaft distal end is configured such that the RF receiving circuitry does not directly receive spurious reflections or clutter from a user holding the shaft during the sampling windows.

2. The system of claim 1 further including a temperature-controlled programmable delay line that controls sampling window instants.

3. The system of claim 2 further including a temperature controlled chamber, at least the programmable delay line being disposed within the temperature controlled chamber.

4. The system of claim 1 further including a digital analog discriminator generator that controls radar timing.

5. The system of claim 1 wherein the RF transmitting circuitry includes a transmit control circuit configured to automatically control transmit output power and stability.

6. The system of claim 5 wherein the RF transmitting circuitry comprises an avalanche semiconductor device.

7. The system of claim 1 wherein the RF receiving circuitry comprises an RF receiver output processing circuit that removes offsets from or controls amplitude of the RF receiving circuitry outputs.

8. The system of claim 1 wherein the hand-supportable elongated shaft defines a hollow space therein enclosing conductors that communicate said RF receiving circuitry outputs to display electronics at the shaft holding end; and the system further includes structure disposed within the hollow space that prevents the conductors from moving within the shaft.

9. The system of claim 1 further including, a baseline comparison circuit connected to receive the RF receiving circuitry outputs, the baseline comparison circuit acquiring a baseline during a first mode of operation and comparing the RF receiving circuitry outputs with said acquired baseline during a second mode of operation.

10. The system of claim 9 wherein the first mode of operation comprises suspending the radome in the air away from any significant reflecting source.

11. The system of claim 1 further including a human-readable graphical display at the shaft holding end that displays visual information showing targets within the ground based on the RF receiving circuitry outputs.

12. The system of claim 1 further including a shutoff mechanism that automatically deactivates the RF transmitting circuitry during periods of non-use.

13. The system of claim 1 further including, a field programmable gate array connected to receive the RF receiving circuitry output, the field programmable gate array being configured to control the RF transmitting circuitry, the RF receiving circuitry, and a display.

14. The system of claim 1 wherein the shaft is shaped and dimensioned to suspend the radome close to but above the ground when the user holds the shaft in the hands and walks along the ground.

15. The system of claim 1 wherein the RF transmitting circuitry and the receiving circuitry disposed within the radome have a low radar cross-section.

16. The system of claim 1 further comprising at least one of a transmit antenna and a receive antenna each comprising a discretely loaded inverted vee dipole antenna disposed within the radome.

17. A portable radar comprising:

a hand-supportable elongated shaft having a holding end and a distal end, a radome, an inverted vee transmit antenna and an inverted wee receive antenna being disposed on the shaft distal end, the radome, the antennas, and the elongated shaft all being fabricated from low radar cross section material(s), the shaft having a length configured such that direct reflections from a user or further electronics at the holding end from being received during real time sampling windows;

an avalanche RF emitter including the inverted vee transmit antenna disposed within the radome, the avalanche RF emitter using a current avalanche to emit wideband RF pulses in the 100 MHz to 6 GHz range;

an RF receiver including the inverted vee receive antenna disposed within the radome, the RF receiver using the real time sampling windows to produce outputs indicative of reflections of said emitted RF pulses; and a temperature-controlled control circuit operatively connected to the avalanche RF emitter and the RF receiver, the temperature-controlled control circuit synchronizing RF receiver output sampling with the avalanche RF emitter pulse emission.

18. The portable radar of claim 17 wherein the RF emitter comprises a single avalanche transistor.

19. The portable handheld radar of claim 1 wherein the shaft length is dimensioned for lengthened sampling windows by providing a longer distance from spurious reflections or clutter directly from the user or further electronics at the holding end from being received during the lengthened sampling windows.

20. The portable radar of claim 17 wherein the portable radar weighs less than 20 pounds.

\* \* \* \* \*